United States Patent
Koo et al.

(10) Patent No.: US 8,548,196 B2
(45) Date of Patent: Oct. 1, 2013

(54) METHOD AND INTERFACE OF RECOGNIZING USER'S DYNAMIC ORGAN GESTURE AND ELEC TRIC-USING APPARATUS USING THE INTERFACE

(75) Inventors: Hyung-Joon Koo, Seoul (KR); Sung-Gae Lee, Gunpo-si (KR); Hyun-Jung Nam, Busan (KR)

(73) Assignee: LG Display Co., Ltd., Seoul (KR)

( * ) Notice: Subject to any disclaimer, the term of this patent is extended or adjusted under 35 U.S.C. 154(b) by 135 days.

(21) Appl. No.: 13/222,884

(22) Filed: Aug. 31, 2011

(65) Prior Publication Data

US 2012/0070035 A1 Mar. 22, 2012

(30) Foreign Application Priority Data

Sep. 17, 2010 (KR) ........................ 10-2010-0091743

(51) Int. Cl.
*G06K 9/00* (2006.01)
(52) U.S. Cl.
USPC ............................ 382/103; 382/168; 382/181
(58) Field of Classification Search
USPC .................. 382/103, 168–173, 181, 190, 199
See application file for complete search history.

(56) References Cited

U.S. PATENT DOCUMENTS

| | | | |
|---|---|---|---|
| 5,150,432 A * | 9/1992 | Ueno et al. | 382/250 |
| 5,949,481 A * | 9/1999 | Sekine et al. | 348/207.99 |
| 8,213,679 B2 * | 7/2012 | Yao | 382/103 |
| 2007/0237387 A1 * | 10/2007 | Avidan et al. | 382/159 |
| 2010/0092036 A1 * | 4/2010 | Das et al. | 382/103 |
| 2010/0272366 A1 * | 10/2010 | Meng et al. | 382/190 |
| 2011/0255743 A1 * | 10/2011 | Guan et al. | 382/103 |
| 2011/0311129 A1 * | 12/2011 | Milanfar et al. | 382/154 |
| 2012/0002052 A1 * | 1/2012 | Muramatsu et al. | 348/148 |
| 2012/0076361 A1 * | 3/2012 | Fujiyoshi | 382/103 |
| 2012/0093360 A1 * | 4/2012 | Subramanian et al. | 382/103 |
| 2012/0133580 A1 * | 5/2012 | Kirby et al. | 345/156 |

FOREIGN PATENT DOCUMENTS

CN 101408929 A 4/2009

OTHER PUBLICATIONS

Dalal et al., "Histograms of Oriented Gradients for Human Detection", Proceeding of IEEE Conference on Computer Vision and Pattern Recognition, 2005.*
Office Action issued in corresponding Chinese Patent Application No. 201110263728.X, mailed Feb. 20, 2013.
Zeng et al., "Pedestrian Detection Based on HOG of ROI" Computer Engineering, vol. 35, No. 24, Dec. 2009.

* cited by examiner

*Primary Examiner* — Li Liu
(74) *Attorney, Agent, or Firm* — Brinks Hofer Hofer & Lione

(57) ABSTRACT

A method of recognizing a user's dynamic organ for use in an electric-using apparatus includes comparing a background image and a target image, which are inputted through an imaging element, to detect a candidate region including portions of the target image that are different between the background image and the target image; scanning the candidate region using a window; generating a HOG (histograms of oriented gradients) descriptor of a region of the target image that is scanned when it is judged that the scanned region includes a dynamic organ; measuring a resemblance value between the HOG descriptor of the scanned region and a HOG descriptor of a query template for a gesture of the dynamic organ; and judging that the scanned region includes the gesture of the dynamic organ when the resemblance value meets a predetermined condition.

24 Claims, 9 Drawing Sheets

METHOD AND INTERFACE OF RECOGNIZING USER'S DYNAMIC ORGAN GESTURE AND ELEC TRIC-USING APPARATUS USING THE INTERFACE

This application claims the benefit of Korea Patent Application No. 10-2010-0091743, filed on Sep. 17, 2010, the entire contents of which is incorporated herein by reference for all purposes as if fully set forth herein.

BACKGROUND

1. Field of the Invention

The present disclosure relates to a method of recognizing a user's dynamic organ gesture, and more particularly, to method and interface of recognizing a user's dynamic organ gesture and an electric-using apparatus using the interface 2. Discussion of the Related Art As various multi-media systems are developed based upon image information, needs for technologies that understand information included in an image and apply the information to various fields increase. Particularly, much attention is on establishing an easier interface environment through recognition of a human's gesture such as a hand movement in an image.

However, in the related art, when the background is complicated or a skin color region other than a hand exists, it is difficult to accurately recognize a hand.

A method of recognizing a hand gesture in the related art is briefly explained as follows. A learning based upon a Gaussian mixture model is conducted in a normalized RGB color space using a number of data sets. Using similarity to a model generated through the learning, a skin color image is detected in a frame image. Further, a hand movement image is generated using brightness difference between frame images. By applying the hand movement image to the detected skin color image, a hand likelihood image is generated. Using an integral image characteristic, a hand candidate region is detected from the hand likelihood image. Using a centric coordinate of the hand candidate region and an optical flow component, a hand gesture is finally judged.

The related art method as above has following problems. When a skin color region other than a hand region exists in an image, it is difficult to distinguish therebetween. Further, when something like a human's movement exists in a background, it is difficult to detect a hand movement. Further, many amounts of data sets are required, and, much time and effort are required to make a reliable model based upon the data sets. Further, the method is vulnerable to variation of an indoor lighting, and false detection of a hand movement frequently occurs due to noise of a camera that is used to take an image.

As described above, the related art method causes reduction of efficiency and reliability.

BRIEF SUMMARY

A method of recognizing a user's dynamic organ for use in an electric-using apparatus includes comparing a background image and a target image, which are inputted through an imaging element, to detect a candidate region including portions of the target image that are different between the background image and the target image; scanning the candidate region using a window; generating a HOG (histograms of oriented gradients) descriptor of a region of the target image that is scanned when it is judged that the scanned region includes a dynamic organ; measuring a resemblance value between the HOG descriptor of the scanned region and a HOG descriptor of a query template for a gesture of the dynamic organ; and judging that the scanned region includes the gesture of the dynamic organ when the resemblance value meets a predetermined condition.

In another aspect, an interface for use in an electric-using apparatus includes an imaging element; and a dynamic organ gesture recognition portion that compares a background image and a target image, which are inputted through the imaging element, to detect a candidate region including portions of the target image that are different between the background image and the target image; scans the candidate region using a window; generates a HOG (histograms of oriented gradients) descriptor of a region of the target image that is scanned when it is judged that the scanned region includes a dynamic organ; measures a resemblance value between the HOG descriptor of the scanned region and a HOG descriptor of a query template for a gesture of the dynamic organ; and judges that the scanned region includes the gesture of the dynamic organ when the resemblance value meets a predetermined condition.

In yet another aspect, an electric-using apparatus includes an interface including a dynamic organ gesture recognition portion that compares a background image and a target image, which are inputted through an imaging element, to detect a candidate region including portions of the target image that are different between the background image and the target image; scans the candidate region using a window; generating a HOG (histograms of oriented gradients) descriptor of a region of the target image that is scanned when it is judged that the scanned region includes a dynamic organ; measures a resemblance value between the HOG descriptor of the scanned region and a HOG descriptor of a query template for a gesture of the dynamic organ; and judges that the scanned region includes the gesture of the dynamic organ when the resemblance value meets a predetermined condition; and a control circuit that controls operation of the electric-using apparatus according to recognition result of the gesture of the dynamic organ from the interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to the illustrated embodiments of the present invention, which are illustrated in the accompanying drawings.

Figure 1:
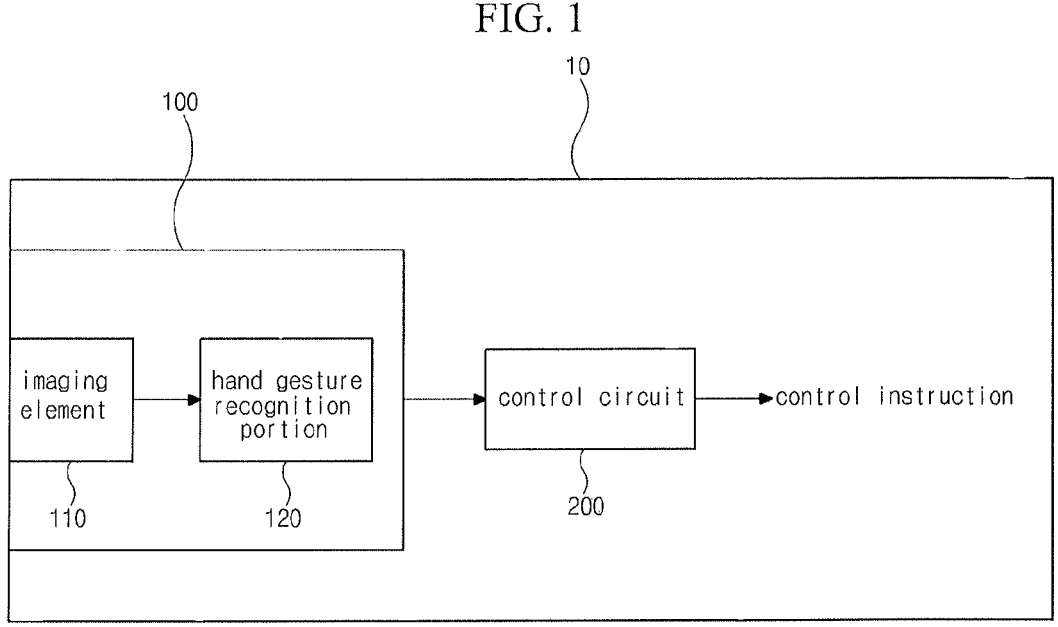
FIG. 1 is a schematic view illustrating an apparatus including an interface to recognize a hand gesture according to an embodiment of the present invention.
Figure 2:
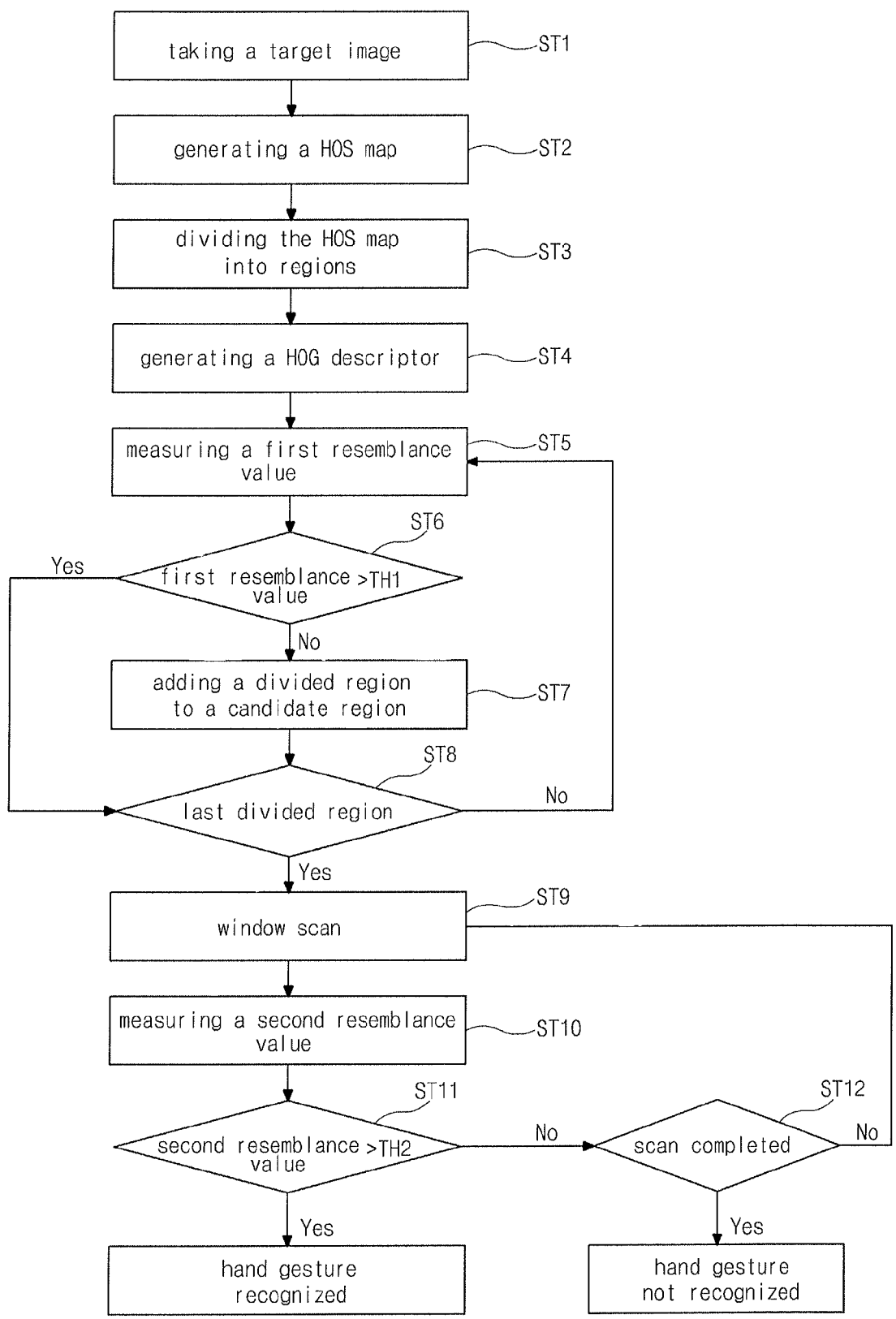
FIG. 2 is a schematic view illustrating a method to recognize a hand gesture according to the embodiment of the present invention.

FIG. 1 is a schematic view illustrating an apparatus including an interface to recognize a hand gesture according to an embodiment of the present invention, and FIG. 2 is a schematic view illustrating a method to recognize a hand gesture according to the embodiment of the present invention.

Referring to FIG. 1, the apparatus 10 may include an interface 100 and a control circuit 200.

The apparatus 10 may be defined as one of all types of apparatuses that are controlled and operated based upon information inputted through the interface 100 and uses electric power in operation. For example, various types of apparatuses, for example, a display device, such as a plasma display panel, a liquid crystal display, or an organic light emitting diode, a washing machine, a refrigerator, an air conditioner, an industrial equipment, and the like may be used as the apparatus 10 according to the embodiment. Accordingly, the apparatus 10 may be referred to as an electric-using apparatus 10.

The interface 100 may include an imaging element 110 and a hand gesture recognition portion 120.

A camera may be uses as the image element 110. The imaging element 110 takes images in front thereof, and the taken images are inputted by the frame into the hand gesture recognition portion 120.

The hand gesture recognition portion 120 detects and recognizes a hand gesture from the inputted images thereto.

The recognition result of the hand gesture is transferred to the control circuit 200. The control circuit 200 generates and outputs a control instruction corresponding to the recognition result of the hand gesture.

According to the control instruction, the electric-using apparatus 10 is controlled and operated. For example, when a display device is used as the apparatus 10, various instructions such as turning off a power, changing channels, adjusting a volume and the like may be conducted.

A method of recognizing a hand gesture according to the embodiment of the present invention is explained with further reference to FIGS. 2 to 9.

A background may be taken through the imaging element 110 in advance and stored in a storage element. For the convenience of explanation, an image of the taken background may be referred to as a background image.

Then, a first step ST1 is performed that an image is taken through the imaging element 110 in a state that a user exists on the background, and the image is inputted to the hand gesture recognition portion 120. For the convenience of explanation, a frame image as an image that is inputted for a current frame to recognize a hand gesture may be referred to as a target image.

Then, a second step ST2 is performed that a HOS map is generated for the target image.

The HOS map is generated using a HOS (high order statistics) information. In other words, a HOS information for brightness of pixels of the target image is found, and thus a feature space is changed.

To find a HOS information for each pixel, a second-order moment is calculated using a following first expression:

$$m^{(2)}(x, y, n) = \frac{1}{N_B} \sum_{(x,y) \in B(x,y)} (I(x, y, n) - \hat{m}(x, y, n))^2.$$

In the first expression, the $B(x,y)$ is a set of a pixel at a coordinate $(x,y)$ and the surrounding pixels, and the $N_B$ is a magnitude of the $B(x,y)$. The $I(x, y, n)$ is a brightness of the pixel at the coordinate $(x,y)$ in a $n^{th}$ frame, and the $\hat{m}(x, y, n)$ is an average brightness of the $B(x,y)$ in the $n^{th}$ frame. Regarding the first expression, since a range of the second-order moment may be much beyond a maximum value of image brightness, a top value of the range may be limited to a predetermined value, for example, the maximum value of image brightness. For example, when the top value is limited to "255", the HOS information is found by a following second expression:

$$HOS(x, y, n) = \text{MIN}\left(255, \frac{m^{(2)}(x, y)}{DSF}\right).$$

The DSF is a down scaling factor, and, in the embodiment, for example, "10" is assigned to the DSF.

Using the HOS information obtained through the first and second expressions as above, the HOS map for the target image can be generated.

As described above, since the HOS map is generated using the HOS information, even though a noise occurs in the target image because of the imaging element 110 or the like, robust recognition of hand gesture can be made. This is explained with reference to FIGS. 3 to 6.

Figure 3:
FIG. 3 is a picture illustrating an example of a target image where a noise does not occur.
Figure 4:
FIG. 4 is a picture illustrating a noise occurring in the target image of FIG. 3.
Figure 5:
FIG. 5 is a picture illustrating an edge magnitude map for the target image of FIG. 4.
Figure 6:
FIG. 6 is a picture illustrating a HOS map, for the target image of FIG. 4, generated according to the embodiment of the present invention.

FIG. 3 shows an example of a target image where a noise does not occur, FIG. 4 shows a noise occurring in the target image of FIG. 3, FIG. 5 shows an edge magnitude map for the target image of FIG. 4, and FIG. 6 shows a HOS map, for the target image of FIG. 4, generated according to the embodiment of the present invention.

Comparing the edge magnitude map of FIG. 5 and the HOS map of FIG. 6, in the case that the noise exists in the target image, boundary of hand is preserved in the HOS map better than in the edge magnitude map.

As such, since the HOS map is employed, reliability of hand gesture recognition can be assured not only when an original image is itself inputted as the target image without noise but also when the target image has a noise.

A HOS map for the background image is generated, and this may be performed in a process of generating the HOS map for the target image, or may be performed prior to the process of the generating the HOS map for the target image and the HOS map for the background image may be stored in a storage element.

The HOS map of the background image may be generated using the first and second expressions as above.

Then, a third step ST3 is performed that the HOS map of the target image is divided into regions that are the same in size, and the HOS map of the background image is divided into regions that are the same in size. Accordingly, the divided regions of the target images are configured to correspond to the divided regions of the background image, respectively.

Then, a fourth step ST4 is performed that a HOG (histograms of oriented gradients) descriptor for each divided region of the target image based upon the HOS map of the target image is generated, and a HOG descriptor for each divided region of the background image based upon the HOS map of the background image is generated.

In generating the HOG descriptors, for each of the divided region of the target image and the divided region of the background image, a histogram is generated by the block using magnitude and orientation of brightness gradient. The block is configured to have a size less than those of the divided region. For example, the block has a size of W/4*H/4, and the W and H are the width and height, respectively, of the divided region.

By connecting the histograms for all the blocks in the divided region, the HOG descriptor of each of the divided region of the target image and the divided region of the background image can be generated. The histogram for the block may be found by following third and fourth expressions.

The third expression is $H_{r,i}^b = (h_{r,i,1}^b, h_{r,i,2}^b, \ldots, h_{r,i,K}^b)$, where $$h_{r,i,j}^b = \frac{E_{r,i,j}}{\sqrt{\sum_{l=1}^{K}(E_{r,i,l})^2 + \varepsilon}} \text{ and } E_{r,i,j} = \sum_{\substack{(x,y) \in B_{r,i} \\ \theta(x,y) \in j}} m(x, y).$$

The fourth expression is $H_{r,i}^t(n) = (h_{r,i,1}^t(n), h_{r,i,2}^t(n), \ldots, h_{r,i,K}^t(n))$, where $$h_{r,i,j}^t(n) = \frac{E_{r,i,j}}{\sqrt{\sum_{l=1}^{K}(E_{r,i,l})^2 + \varepsilon}} \text{ and } E_{r,i,j} = \sum_{\substack{(x,y) \in B_{r,i} \\ \theta(x,y) \in j}} m(x, y).$$

The i is an index of block, and the K is a quantization level for orientation. The m(x,y) is a magnitude of brightness gradient of a pixel at a coordinate (x,y), and the θ(x,y) is a quantized orientation. The r and n are an index of divided region and a frame number, respectively. The $\varepsilon$ is a small positive real number, for example, 0.00001, and it is set such that the denominator is not zero. The index of block is a factor indicating a location of the block, and the index of divided region is a factor indicating a location of the divided region.

By connecting the histograms obtained through the third and fourth expressions, the HOG descriptors for the divided region of the target image and the divided region of the background image can be generated. The HOG descriptors for the divided region of the target image and the divided region of the background image may be expressed as $H_r^b$ and $H_r^t(n)$, respectively.

The blocks neighboring along the x direction and the y direction may be configured to overlap each other. For example, the neighboring blocks along the x direction may overlap each other by half a width of the block, and the neighboring blocks along the y direction may overlap each other by half a height of the block. However, it should be understood that the overlap width and height may vary.

Figure 7:
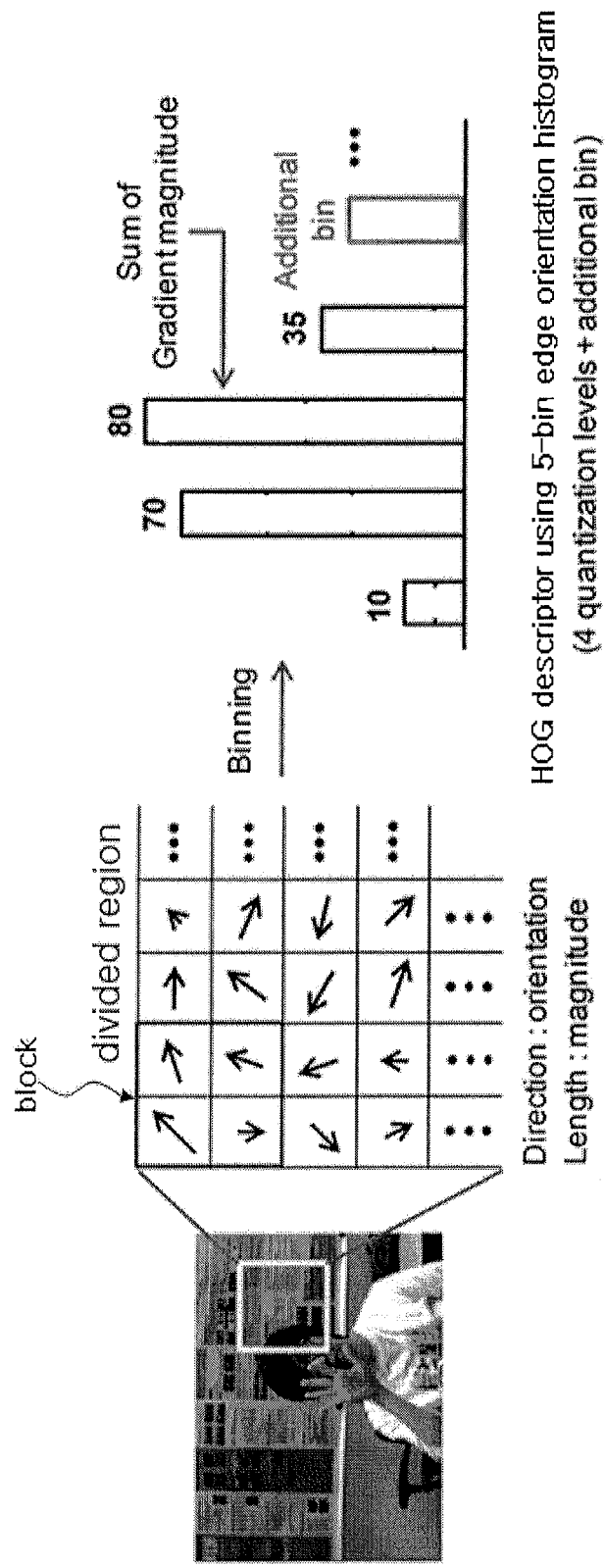
FIG. 7 is a view illustrating an example of processes of generating a HOG descriptor according to the embodiment of the present invention.

FIG. 7 shows an example of processes of generating the HOG descriptor according to the embodiment of the present invention. In FIG. 7, it is shown that the HOG descriptor is generated for the rectangular divided region of the left target image.

Referring to FIG. 7, magnitude and orientation of brightness gradient for each of pixels in the divided region are represented by an arrow. A length of the arrow is the magnitude of brightness gradient.

For the divided region, histograms are generated by the block and are connected to finally generate a HOG descriptor. In FIG. 7, it is shown that the HOG descriptor is generated using a 5-bin edge orientation histogram. In this case, the 5 bins may include 4 bins (which are sequentially shown from left to right) corresponding to 4 quantization levels (to which a range from over 0 degree to 45 degrees, a range from over 45 degrees to 90 degrees, a range from over 90 degrees to 135 degrees, and a range from over 135 degrees and 180 degrees are assigned, respectively), and an additional bin. The additional bin is for an orientation of 0 degree.

Then, to delete the background surrounding the user from the target image, whether the target image and the background image are matched or not is determined.

To do this, for example, a fifth step ST5 is performed that a resemblance value between the HOG descriptors of the corresponding divided regions of the target image and the background image is measured. This resemblance value may be referred to as a first resemblance value.

To measure the first resemblance value, a cosine similarity may be used. The first resemblance value through the cosine similarity is measured in a following fifth expression:

$$f(\rho_r) = \frac{\rho_r}{1 - \rho_r}, \text{ where } \rho_r(H_r^b, H_r^t) = \frac{(H_r^b)^T H_r^t}{\|H_r^b\| \|H_r^t\|}.$$

The $(H_r^b)^T$ is a permutation matrix of the $H_r^b$, the $\rho_r$ is a cosine similarity, and $f(\rho_r)$ is a resemblance value measurement function.

Then, an sixth step ST6 is performed that whether the first resemblance value measured through the fifth expression is greater than a first critical value TH1 or not is judged.

When the first resemblance value is the second critical value TH1 or less, it is judged that the divided region of the target image is not substantially identical to the divided region of the background image. In this case, a seventh step ST7 is performed that the divided region of the target image is added to a candidate region.

When the first resemblance value is greater than the first critical value TH1, it is judged that the divided region of the target image is substantially identical to the divided region of the background image.

When the first resemblance value is the first critical value TH1 or less, it is judged that the divided region of the target image is substantially different from the divided region of the background image.

As described above, through whether the similarity between the HOG descriptor of the divided region of the target image and the HOG descriptor of the divided region of the background image meets the predetermined condition or not, whether the background exists in the divided region of the target image or not can be judged.

Then, an eighth step ST8 is performed that whether the divided region is the last divided region is judged. For example, this may be confirmed through an index of divided region. This step is performed irrespective of the similarity between the HOG descriptors of the divided regions of the target image and the background image.

When the divided region is not the last divided region, a return to the sixth step ST6 is made and the follow-up steps as above are repeated for a next divided region.

When the divided region is the last divided region, the candidate region is finally determined and a next step is performed.

Figure 8:
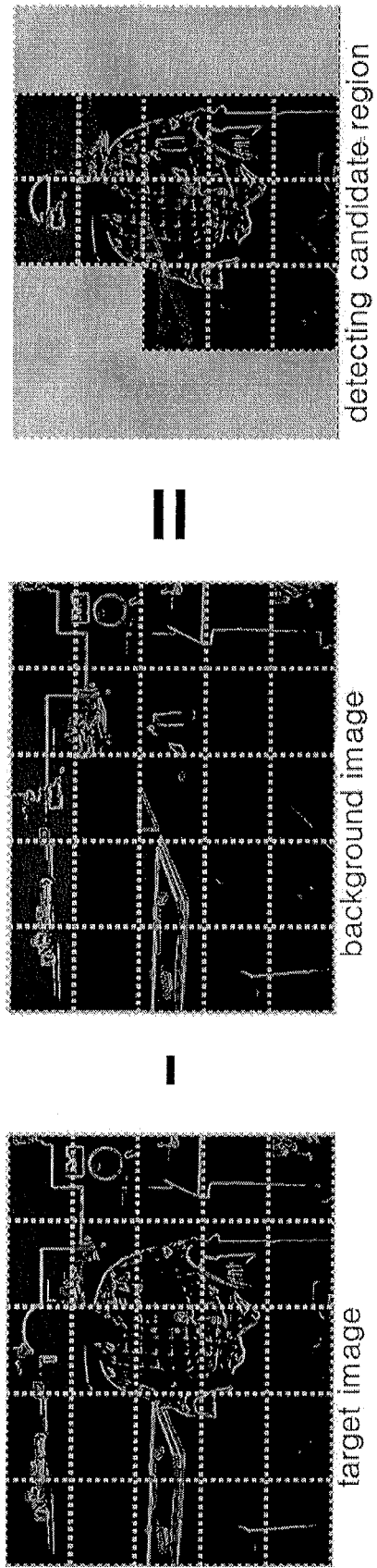
FIG. 8 is a view illustrating an example of a candidate region detected using similarity between a target image and a background image according to the embodiment of the present invention.

The method of detecting the candidate region as above is described with reference to FIG. 8. FIG. 8 shows an example of a candidate region detected using similarity between a target image and a background image according to the embodiment of the present invention. In FIG. 8, a region surrounded by dot lines indicates a divided region.

Referring to FIG. 8, divided regions including the background are excluded from the target image while divided regions including a user's image remains to finally constitute the candidate region.

As described above, the candidate region can be detected from the target image through whether the divided regions of the target image include the user's image or not. Accordingly, follow-up steps are not needed for the regions not including the user's image. Thus, rate of hand gesture recognition can be fast.

After the candidate region is determined, a ninth step ST9 is performed that the candidate region is scanned by a window WD.

The window scan is explained with reference to FIG. 9 that is a view illustrating an example of the window scan according to the embodiment of the present invention.

Figure 9:
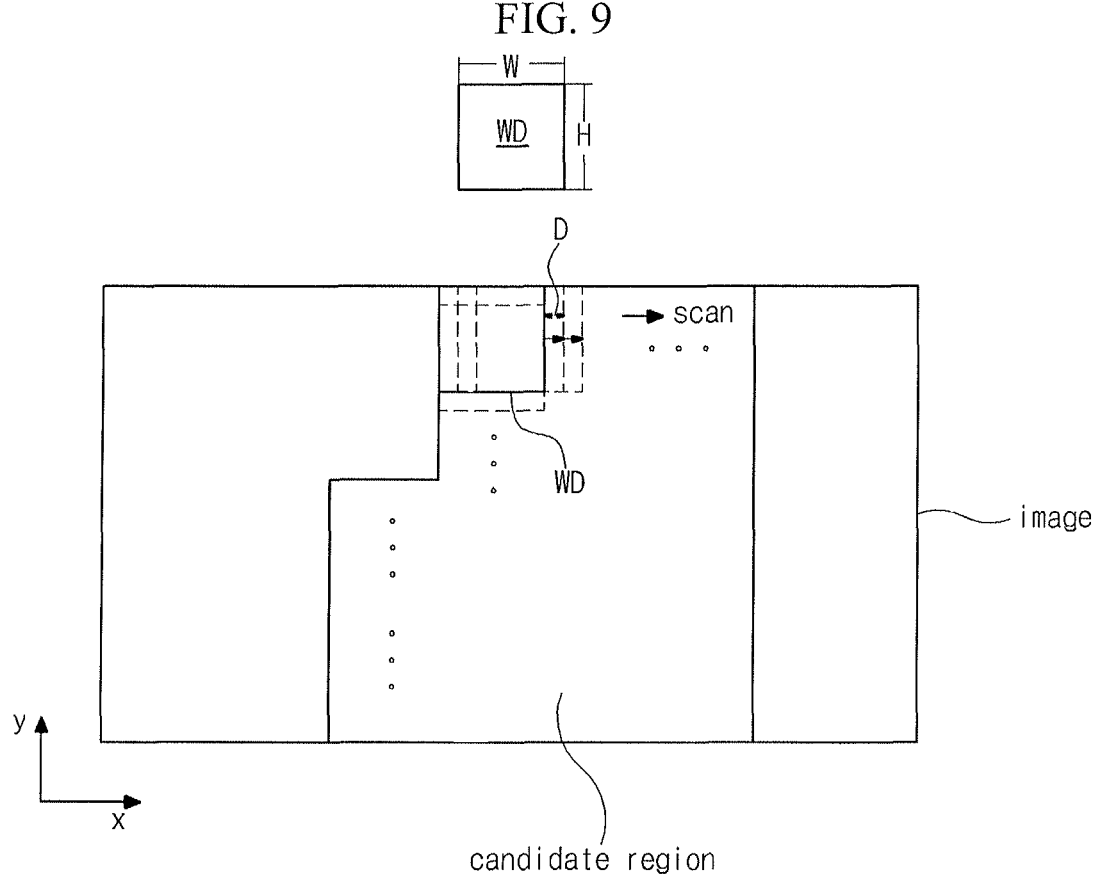
FIG. 9 that is a view illustrating an example of a window scan according to the embodiment of the present invention.

Referring to FIG. 9, the window WD having a width W and a height H moves along a direction, for example, a row direction (i.e., a x direction) and performs scanning. One row i.e., a scan row is completely scanned, and then scanning a next scan row is performed.

A moving distance D of the window WD by the scan i.e., a distance between the neighboring window scans along the row direction may be less than the width W of the window WD. For example, a current scan region is scanned, then the window WD moves by a number of pixels less than a number of pixels corresponding to the width W, and then a next scan region is scanned. Accordingly, the neighboring scan regions along the row direction may overlap each other.

Further, neighboring scan regions along a column direction i.e., a y direction may overlap each other. For example, scanning a scan row is completely performed, then the window WD shifts by a number of pixels less than a number of pixels corresponding to the height H, and then a next scan row is scanned. Accordingly, the neighboring scan regions along the column direction may overlap each other.

The size of the window WD may be configured to be the same as that of the divided region as described above. However, it should be understood that the size of the window WD may vary.

Further, it is preferred that the size of the window WD is configured to be the same as that of a query template for hand gesture. The query template for hand gesture is a particular hand shape model to recognize a corresponding hand gesture in the target image.

Then, to judge whether the scan region includes the hand gesture of the query template, a template-matching is performed.

To do this, for example, a tenth step ST10 is performed that a resemblance value between a HOG descriptor of the query template and a HOG descriptor of the scan region is measured. This resemblance value may be referred to as a second resemblance value.

The HOG descriptor of the query template and the HOG descriptor of the scan region may refer to the HOG descriptor of the divided region of the background image and the HOG descriptor of the divided region of the target image, respectively, as described above.

For example, by connecting histograms for blocks of the query template obtained through a following sixth expression, the HOG descriptor of the query template can be generated. Further, by connecting histograms for blocks of the scan region obtained through a following seventh expression, the HOG descriptor of the scan region can be generated. The HOG descriptor of the scan region may be generated based upon the HOS map as described above. For the convenience of explanation, the seventh expression is expressed identically to the fourth expression.

The sixth expression is $H_i^q = (h_{i,1}^q, h_{i,2}^q, \ldots, h_{i,K}^q)$, where $$h_{i,j}^q = \frac{E_{i,j}}{\sqrt{\sum_{l=1}^{K}(E_{i,l})^2 + \varepsilon}} \text{ and } E_{i,j} = \sum_{\substack{(x,y) \in B_i \\ \theta(x,y) \in j}} m(x,y).$$

The seventh expression is $H_{r,i}^t(n) = (h_{r,i,1}^t(n), h_{r,i,2}^t(n), \ldots, h_{r,i,K}^t(n))$, where $$h_{r,i,j}^t(n) = \frac{E_{r,i,j}}{\sqrt{\sum_{l=1}^{K}(E_{r,i,l})^2 + \varepsilon}} \text{ and } E_{r,i,j} = \sum_{\substack{(x,y) \in B_{r,i} \\ \theta(x,y) \in j}} m(x,y).$$

The HOG descriptors of the query template and the scan region obtained through the sixth and seventh expressions may be expressed as $H^q$ and $H_r^t(n)$, respectively.

The HOG descriptor of the scan region may be generated when the window scan is performed. The HOG descriptor of the query template may be generated when the HOG descriptor of the scan region is generated, or may be generated before the HOG descriptor of the scan region is generated and be stored in a storage device. The block for the query template and the scan region may be, but not limited to, the same in size and/or overlap configuration of block as the block for the background image and the target image.

To measure the second resemblance value between the HOG descriptor of the query template and the HOG descriptor of the scan region, a cosine similarity may be used.

Measuring the second resemblance value may refer to measuring the first resemblance value as described above.

For example, the second resemblance value is measured in a following eighth expression:

$$f(\rho_r) = \frac{\rho_r}{1-\rho_r},$$

where $$\rho_r(H^q, H_r^t(n)) = \frac{(H^q)^T H_r^t(n)}{\|H^q\| \|H_r^t(n)\|}.$$

The $(H^q)^T$ is a permutation matrix of the $H^q$, the $\rho_r$ is a cosine similarity, and $f(\rho_r)$ is a resemblance value measurement function.

Then, an eleventh step ST11 is performed that whether the second resemblance value measured through the eighth expression is greater than a second critical value TH2 or not is judged.

When the second resemblance value is greater than the second critical value TH2, it is judged that the scan region includes the hand gesture of the query template. Accordingly, the hand gesture is recognized.

When the second resemblance value is the second critical value TH2 or less, it is judged that the scan region does not include the hand gesture of the query template.

As described above, through whether the similarity between the HOG descriptor of the query template and the HOG descriptor of the scan region meets the predetermined condition or not, whether the hand gesture of the query template exists in the scan region or not can be judged.

A plurality of query templates corresponding to a plurality of control instructions, respectively, may be prepared. In this case, priority numbers may be assigned to the plurality of query templates. Accordingly, when a similarity to a query template having a priority number fails to meet a predetermined condition, a process of judging whether a similarity to a query template having a next-lower priority number meets or not is performed.

When the second resemblance value is the second critical value TH2 or less, a twelfth step ST12 is performed that whether scanning the whole candidate region is completed or not is judged.

When the complete scan is not done, a return to the ninth step ST9 is made and the following steps as above are repeated.

When the complete scan is done, it is finally determined that the target image does not include the hand gesture of the query template. In other words, the hand gesture is not recognized.

Alternatively, when it is determined that the scan region includes the hand gesture, a step of judging whether scanning the whole candidate region is completed or not may be performed. In this case, a return to the ninth step ST9 may be made when the complete scan is not done. This may be usefully applied to, for example, multi-gesture recognition when using both hands.

When the hand gesture is recognized according to the above-described method, the corresponding control instruction is made, and the electric-using apparatus 10 operates according to the control instruction.

When the hand gesture is not recognized, for example, a previous control instruction may be kept, and operation of the electric-using apparatus 10 may be kept without variation.

As described above, in the embodiment of the present invention, in order to recognize a hand gesture, a background image and a target image are compared to detect a candidate region having a different image therebetween, then a window scan is performed for the candidate region, then a HOG descriptor of the scan region is generated based upon a HOS map, and then a similarity of the HOG descriptor of the scan region and a HOG descriptor of a query template is judged.

As such, since follow-up steps are performed for the candidate region, rate of hand gesture recognition can be remarkably fast.

Further, even though a noise is included in the inputted target image, the step of generating the HOS map to remove the noise is included. Accordingly, accuracy and reliability of hand gesture recognition can be improved.

Further, a query template is used for hand gesture recognition. Accordingly, time and cost can be reduced compared to the related art learning-based method using many amounts of data sets.

Further, since a hand shape is effectively modeled using the HOG descriptor based upon the HOS map, the method of the embodiment is robust to variation of lighting, and a hand region can be accurately recognized even when a skin color background exists or overlap with other body parts occurs.

Therefore, according to the embodiment of the present invention, reliability and efficiency of hand gesture recognition can be improved.

FIGS. 10 to 13 are pictures illustrating results of hand gesture recognition under various surroundings according to the embodiment of the present invention.

Figure 10:
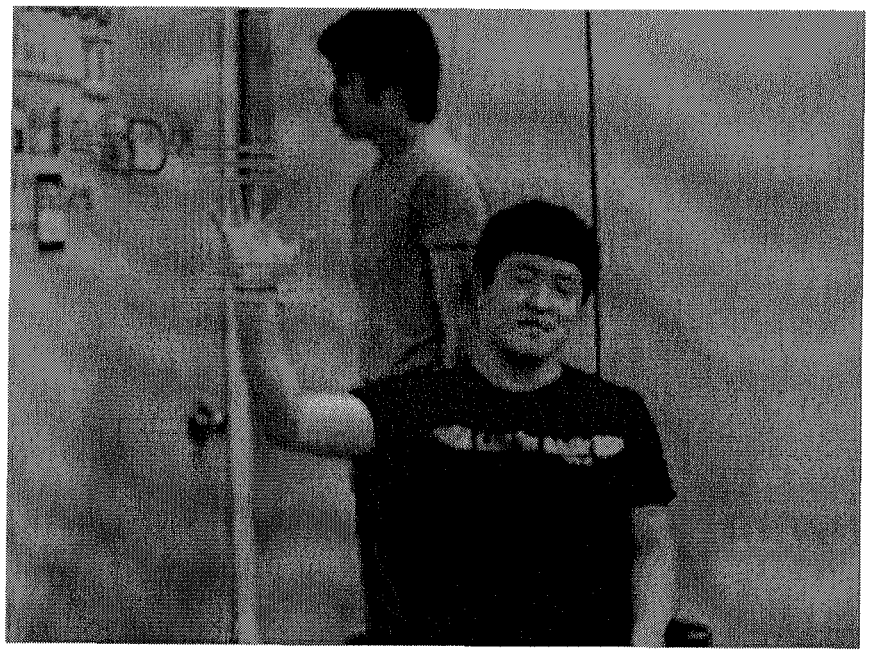
FIGS. 10 to 13 are pictures illustrating results of hand gesture recognition under various surroundings according to the embodiment of the present invention.
Figure 11:
Figure 12:
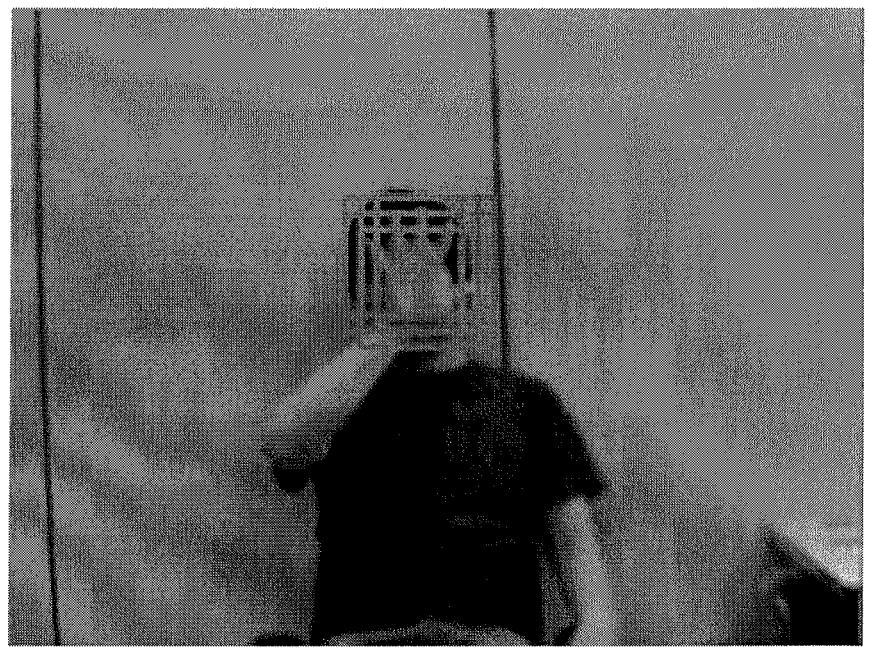
Figure 13:
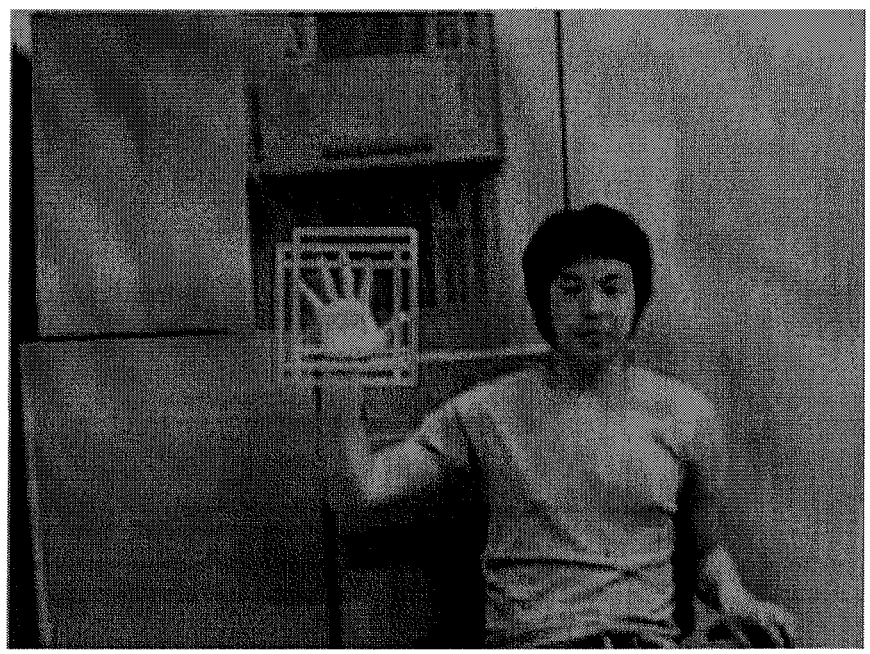

FIGS. 10 and 13 show the result under the surroundings where a movement exists in a background, the result under the surroundings where a complicated configuration exists in a background, the result under the surroundings where a hand and a face overlap, and the result under the surroundings where a skin color background exists extensively, respectively.

Referring to FIGS. 10 and 13, a hand shape is accurately recognized even under various surroundings.

In the embodiment as above, the method of recognizing a hand gesture is explained as an example. However, it should be understood that the method can be applied to recognizing gestures of organs, such as a foot, an arm, a leg, a head and the like, that are able to visually express user's intent i.e., dynamic organs.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of recognizing a user's dynamic organ for use in an electric-using apparatus, the method comprising:

comparing a background image and a target image, which are inputted through an imaging element, to detect a candidate region including portions of the target image that are different between the background image and the target image;

scanning the candidate region using a window;

generating a histograms of oriented gradients (HOG) descriptor of a region of the target image that is scanned when it is judged that the scanned region includes a dynamic organ;

measuring a resemblance value between the HOG descriptor of the scanned region and a HOG descriptor of a query template for a gesture of the dynamic organ; and determining that the scanned region includes the gesture of the dynamic organ when the resemblance value meets a predetermined condition, wherein detecting the candidate region includes:

dividing each of the background image and the target image into regions;

measuring another resemblance value between the corresponding divided regions of the background image and the target image; and adding the divided region of the target image to the candidate region when the another resemblance value meets another predetermined condition, and wherein the another resemblance value is a resemblance value between HOG descriptors of the corresponding divided regions of the background image and the target image, and wherein the HOG descriptors of the corresponding divided regions of the background image and the target image are generated based upon HOS (high order statistics) maps that are generated using HOS information for brightness of the background image and the target image, respectively.

2. The method according to claim 1, wherein the HOG descriptor of the scanned region is generated based upon the HOS map of the target image.

3. The method according to claim 2, wherein generating the HOG descriptor of the divided region or the scanned region based upon the HOS map includes:
   generating histograms for respective blocks using magnitude and orientation of brightness gradient of pixel of the divided region or the scanned region; and
   generating the HOG descriptor of the divided region or the scanned region by connecting the histograms,
   wherein the block has a size less than that of the window, and the neighboring blocks overlap each other.

4. The method according to claim 1, wherein the another resemblance value is measured through a first expression using a cosine similarity between the HOG descriptors of the divided regions of the background image and the target image, and
   wherein the first expression is $$f(\rho_r) = \frac{\rho_r}{1-\rho_r},$$

where $$\rho_r(H_r^b, H_r^t) = \frac{(H_r^b)^T H_r^t}{\|H_r^b\|\|H_r^t\|}$$

(where the $H_r^b$ and $H_r^t$ are the HOG descriptors of the corresponding divided regions of the background image and the target image, respectively, the $(H_r^b)^T$ is a permutation matrix of the $H_r^b$, the $\rho_r$ is the cosine similarity, and the $f(\rho_r)$ is a resemblance value measurement function).

5. The method according to claim 1, wherein the another resemblance value between the HOG descriptor of the scanned region and the HOG descriptor of the query template is measured through a second expression using a cosine similarity between the HOG descriptor of the scanned region and the HOG descriptor of the query template, and
   wherein the second expression is $$f(\rho_r) = \frac{\rho_r}{1-\rho_r},$$

where $$\rho_r(H^q, H_r^t) = \frac{(H^q)^T H_r^t}{\|H^q\|\|H_r^t\|}$$

(where the $H^q$ is the HOG descriptor of the query template, the $H_r^t$ is the HOG descriptor of the scanned region, the $(H^q)^T$ is a permutation matrix of the $H^q$, the $\rho_r$ is the cosine similarity, and the $f(\rho_r)$ is a resemblance value measurement function).

6. The method according to claim 1, wherein the HOS information is found through third and fourth expressions,
   wherein the third expression is $$m^{(2)}(x, y) = \frac{1}{N_B} \sum_{(x,y)\in B(x,y)} (I(x, y) - \hat{m}(x, y))^2$$

(where the $B(x,y)$ is a set of a pixel at a coordinate $(x,y)$ and the surrounding pixels, the $N_B$ is a magnitude of the $B(x,y)$, the $I(x,y)$ is a brightness of the pixel at the coordinate $(x,y)$, the $\hat{m}(x,t)$ is an average brightness of the $B(x,y)$, and the $m^{(2)}(x,y)$ is a second-order moment), and
   wherein the fourth expression is $$HOS(x, y) = MIN\left(UL, \frac{m^{(2)}(x, y)}{DSF}\right)$$

(where the UL is a top limit value, and the DSF is a down scaling factor).

7. The method according to claim 1, wherein, among regions of the candidate region scanned by the window, the neighboring regions along a width direction of the window overlap each other, and the neighboring regions along a length direction of the window overlap each other.

8. The method according to claim 1, wherein the dynamic organ is one of a hand, a foot, a head, an arm, and a leg.

9. An interface for use in an electric-using apparatus, the interface comprising:
   an imaging element; and
   a dynamic organ gesture recognition portion that compares a background image and a target image, which are inputted through the imaging element, to detect a candidate region including portions of the target image that are different between the background image and the target image; scans the candidate region using a window; generates a HOG (histograms of oriented gradients) descriptor of a region of the target image that is scanned when it is judged that the scanned region includes a dynamic organ; measures a resemblance value between the HOG descriptor of the scanned region and a HOG descriptor of a query template for a gesture of the dynamic organ; and judges that the scanned region includes the gesture of the dynamic organ when the resemblance value meets a predetermined condition,
   wherein the dynamic organ recognition portion detects the candidate region through: dividing each of the background image and the target image into regions; measuring another resemblance value between the corresponding divided regions of the background image and the target image; and adding the divided region of the target image to the candidate region when the another resemblance value meets another predetermined condition, and
   wherein the another resemblance value is a resemblance value between HOG descriptors of the corresponding divided regions of the background image and the target image, and wherein the HOG descriptors of the corresponding divided regions of the background image and the target image are generated based upon HOS (high order statistics) maps that are generated using HOS information for brightness of the background image and the target image, respectively.

10. The interface according to claim 9, wherein the dynamic organ recognition portion generates the HOG descriptor of the scanned region based upon the HOS map of the target image.

11. The interface according to claim 10, wherein the dynamic organ recognition portion generates histograms for respective blocks using magnitude and orientation of brightness gradient of pixel of the divided region or the scanned region, and generates the HOG descriptor of the divided region or the scanned region by connecting the histograms,
   wherein the block has a size less than that of the window, and the neighboring blocks overlap each other.

12. The interface according to claim 9, wherein the another resemblance value is measured through a first expression using a cosine similarity between the HOG descriptors of the divided regions of the background image and the target image, and
wherein the first expression is $$f(\rho_r) = \frac{\rho_r}{1-\rho_r},$$

where $$\rho_r(H_r^b, H_r^t) = \frac{(H_r^b)^T H_r^t}{\|H_r^b\|\|H_r^t\|}$$

(where the $H_r^b$ and $H_r^t$ are the HOG descriptors of the corresponding divided regions of the background image and the target image, respectively, the $(H_r^b)^T$ is a permutation matrix of the $H_r^b$, the $\rho_r$ is the cosine similarity, and the $f(\rho_r)$ is a resemblance value measurement function).

13. The interface according to claim 9, wherein the resemblance value between the HOG descriptor of the scanned region and the HOG descriptor of the query template is measured through a second expression using a cosine similarity between the HOG descriptor of the scanned region and the HOG descriptor of the query template, and
wherein the second expression is $$f(\rho_r) = \frac{\rho_r}{1-\rho_r},$$

where $$\rho_r(H^q, H_r^t) = \frac{(H^q)^T H_r^t}{\|H^q\|\|H_r^t\|}$$

(where the is the HOG descriptor of the query template, the $H_r^t$ is the HOG descriptor of the scanned region, the $(H^q)^T$ is a permutation matrix of the $H^q$, the $\rho_r$ is the cosine similarity, and the $f(\rho_r)$ is a resemblance value measurement function).

14. The interface according to claim 9, wherein the HOS information is found through third and fourth expressions,
wherein the third expression is $$m^{(2)}(x, y) = \frac{1}{N_B} \sum_{(x,y) \in B(x,y)} (I(x, y) - \hat{m}(x, y))^2$$

(where the B(x,y) is a set of a pixel at a coordinate (x,y) and the surrounding pixels, the $N_B$ is a magnitude of the B(x,y), the I(x,y) is a brightness of the pixel at the coordinate (x,y), the $\hat{m}(x,y)$ is an average brightness of the B(x,y), and the $m^{(2)}$(x,y) is a second-order moment), and
wherein the fourth expression is $$HOS(x, y) = \text{MIN}\left(UL, \frac{m^{(2)}(x, y)}{DSF}\right)$$

(where the UL is a top limit value, and the DSF is a down scaling factor).

15. The interface according to claim 9, wherein, among regions of the candidate region scanned by the window, the neighboring regions along a width direction of the window overlap each other, and the neighboring regions along a length direction of the window overlap each other.

16. The interface according to claim 9, wherein the dynamic organ is one of a hand, a foot, a head, an arm, and a leg.

17. An electric-using apparatus, comprising:
an interface including a dynamic organ gesture recognition portion that compares a background image and a target image, which are inputted through an imaging element, to detect a candidate region including portions of the target image that are different between the background image and the target image; scans the candidate region using a window; generating a HOG (histograms of oriented gradients) descriptor of a region of the target image that is scanned when it is judged that the scanned region includes a dynamic organ; measures a resemblance value between the HOG descriptor of the scanned region and a HOG descriptor of a query template for a gesture of the dynamic organ; and judges that the scanned region includes the gesture of the dynamic organ when the resemblance value meets a predetermined condition; and
a control circuit that controls operation of the electric-using apparatus according to recognition result of the gesture of the dynamic organ from the interface,
wherein the dynamic organ recognition portion detects the candidate region through: dividing each of the background image and the target image into regions; measuring another resemblance value between the corresponding divided regions of the background image and the target image; and adding the divided region of the target image to the candidate region when the another resemblance value meets another predetermined condition, and
wherein the another resemblance value is a resemblance value between HOG descriptors of the corresponding divided regions of the background image and the target image, and wherein the HOG descriptors of the corresponding divided regions of the background image and the target image are generated based upon HOS (high order statistics) maps that are generated using HOS information for brightness of the background image and the target image, respectively.

18. The apparatus according to claim 17, wherein the dynamic organ recognition portion generates the HOG descriptor of the scanned region based upon the HOS map of the target image.

19. The apparatus according to claim 18, wherein the dynamic organ recognition portion generates histograms for respective blocks using magnitude and orientation of brightness gradient of pixel of the divided region or the scanned region, and generates the HOG descriptor of the divided region or the scanned region by connecting the histograms,
wherein the block has a size less than that of the window, and the neighboring blocks overlap each other.

20. The apparatus according to claim 17, wherein the another resemblance value is measured through a first expression using a cosine similarity between the HOG descriptors of the divided regions of the background image and the target image, and
wherein the first expression is $$f(\rho_r) = \frac{\rho_r}{1-\rho_r},$$

-continued where $$\rho_r(H_r^b, H_r^t) = \frac{(H_r^b)^T H_r^t}{\|H_r^b\|\|H_r^t\|}$$

(where the $H^b{}_r$ and $H_r{}^t$ are the HOG descriptors of the corresponding divided regions of the background image and the target image, respectively, the $(H_r{}^b)^T$ is a permutation matrix of the $H_r{}^b$, the $\rho_r$ is the cosine similarity, and the $f(\rho_r)$ is a resemblance value measurement function).

21. The apparatus according to claim 17, wherein the resemblance value between the HOG descriptor of the scanned region and the HOG descriptor of the query template is measured through a second expression using a cosine similarity between the HOG descriptor of the scanned region and the HOG descriptor of the query template, and
wherein the second expression is $$f(\rho_r) = \frac{\rho_r}{1-\rho_r},$$

where $$\rho_r(H^q, H_r^t) = \frac{(H^q)^T H_r^t}{\|H^q\|\|H_r^t\|}$$

(where the $H^q$ is the HOG descriptor of the query template, the $H_r{}^t$ is the HOG descriptor of the scanned region, the $(H^q)^T$ is a permutation matrix of the $H^q$, the $\rho_r$ is the cosine similarity, and the $f(\rho_r)$ is a resemblance value measurement function).

22. The apparatus according to claim 17, wherein the HOS information is found through third and fourth expressions,
wherein the third expression is $$m^{(2)}(x, y) = \frac{1}{N_B} \sum_{(x,y) \in B(x,y)} (I(x, y) - \hat{m}(x, y))^2$$

(where the B(x,y) is a set of a pixel at a coordinate (x,y) and the surrounding pixels, the $N_B$ is a magnitude of the B(x,y), the I(x,y) is a brightness of the pixel at the coordinate (x,y), the $\hat{m}$(x,y) is an average brightness of the B(x,y), and the $m^{(2)}$(x,y) is a second-order moment), and
wherein the fourth expression is $$HOS(x, y) = \text{MIN}\left(UL, \frac{m^{(2)}(x, y)}{DSF}\right)$$

(where the UL is a top limit value, and the DSF is a down scaling factor).

23. The apparatus according to claim 17, wherein, among regions of the candidate region scanned by the window, the neighboring regions along a width direction of the window overlap each other, and the neighboring regions along a length direction of the window overlap each other.

24. The apparatus according to claim 17, wherein the dynamic organ is one of a hand, a foot, a head, an arm, and a leg.

* * * * *